Figure 3:
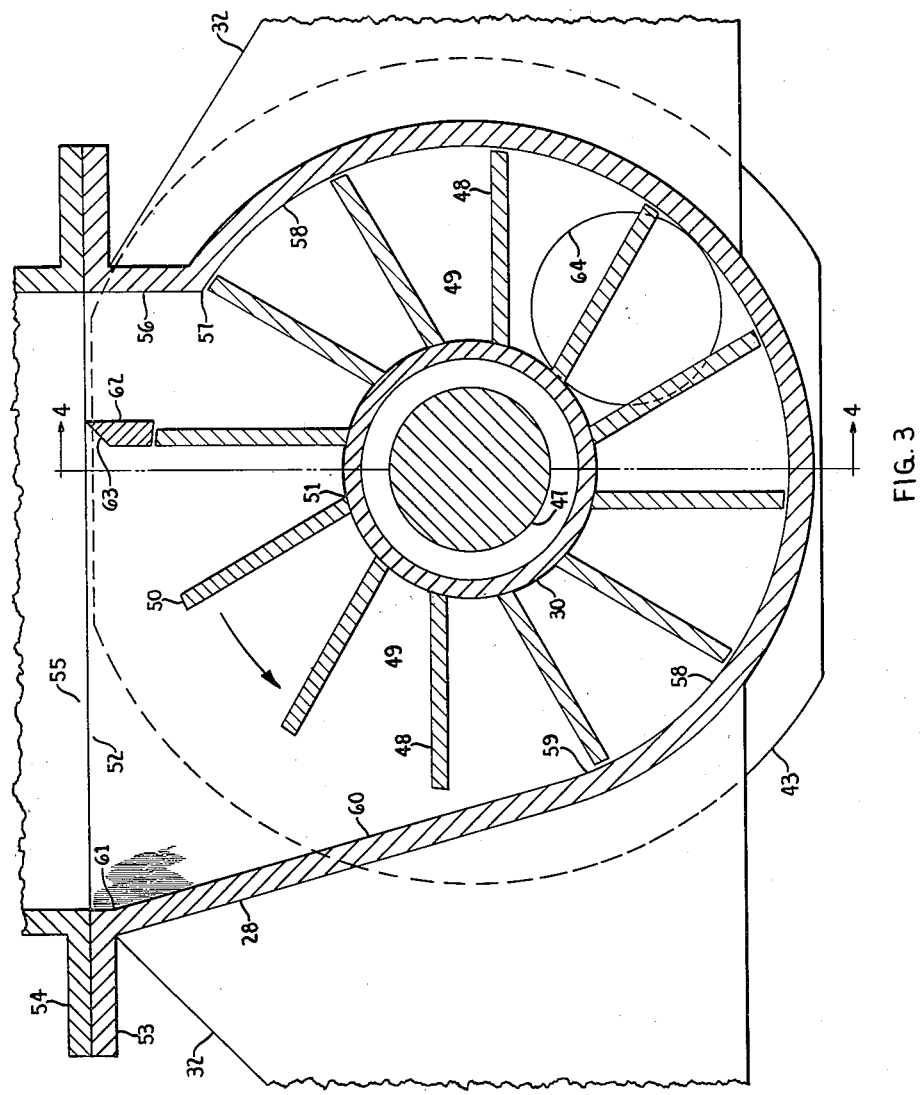

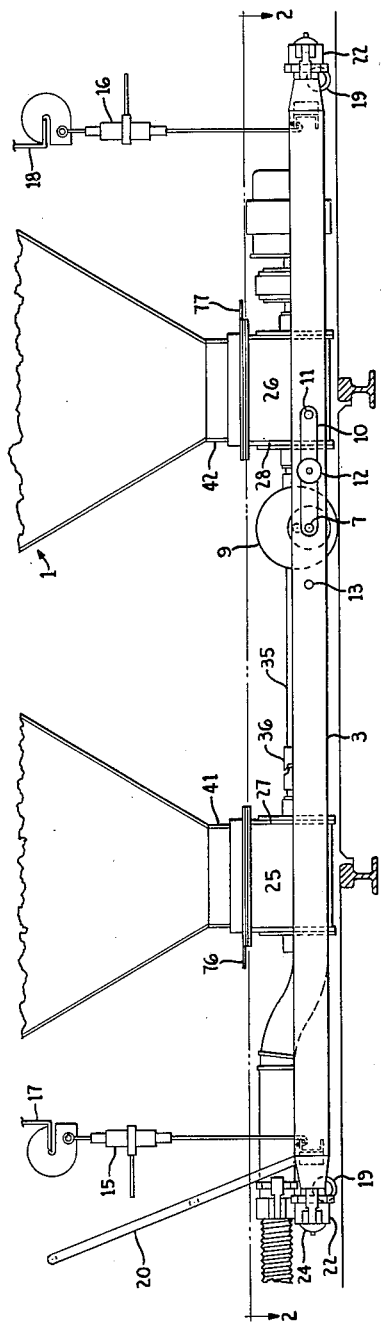

Nov. 21, 1961 H. S. LENHART 3,009,744
UNLOADING AND CONVEYING APPARATUS
Filed Sept. 17, 1958 3 Sheets-Sheet 2

INVENTOR.
HERBERT S. LENHART
BY *Pennie Edmonds*
*Morton Barrows & Taylor*
*Attys*

Nov. 21, 1961 H. S. LENHART 3,009,744
UNLOADING AND CONVEYING APPARATUS
Filed Sept. 17, 1958 3 Sheets-Sheet 3

INVENTOR.
HERBERT S. LENHART
BY

United States Patent Office 3,009,744
Patented Nov. 21, 1961

3,009,744
UNLOADING AND CONVEYING APPARATUS
Herbert S. Lenhart, Allentown, Pa., assignor to Fuller Company, a corporation of Delaware
Filed Sept. 17, 1958, Ser. No. 761,635
12 Claims. (Cl. 302—49)

The present invention relates to the unloading and conveying of pulverulent and granular solid materials, and is more particularly concerned with the pneumatic conveying of such materials by an unloader employing rotary feeders.

The conveying capacity of rotary feeders is dependent upon the feeder size, the rotational speed of the rotor, the capacity of the air source with respect to the pressure requirements of the system, and the extent to which each pocket of the rotor is filled with material before indexing with the conveying line, as well as the extent to which the material in each pocket is removed therefrom and entered into the conveying line.

An increase of a given feeder's capacity may be effected, in some cases, by simple expedients such as using higher rotational speeds and larger blowers. In many cases, however, these changes are insufficient in themselves to obtain the desired performance.

In the unloading of bulk transport vehicles such as disclosed in U.S. Patent 2,589,968 to H. R. Schemm, or U.S. Patent 2,681,748 to L. G. Weller, for example, the problem of obtaining maximum conveying capacity from a rotary feeder is complicated by physical restrictions on the size of feeder which may be applied under the vehicle. The ground clearance of highway trailers and rail clearance of railway vehicles, which carry their ladings as low as is practical in order to obtain low centers of gravity, rigidly limit the vertical dimensions of any unloading apparatus applied thereunder. With the feeder size thus limited, and the rotor r.p.m. and the air supply determined, increases in capacity for the system must be accomplished by improving the extent of filling and emptying of the individual pockets.

Heretofore, attempts to improve on the extent of pocket filling and emptying have included various ways of venting residual air from empty pockets, packed or forced entry of material into the pockets, fluidization of the material prior to entrance to the feeder, and various pocket designs and modifications. However, these arrangements have not been found entirely satisfactory.

The present invention provides an unloader employing a rotary feeder having means for venting air trapped in a rotor pocket upwardly into the material above the rotor without substantial interference of the air with the bulk of the downcoming material, thereby permitting the agitation of the bin contents by the rising air, and further provides for efficient filling and discharge of the pockets without radial projection of entered material from the pockets or overloading of the conveying stream with material.

In general, the preferred form of the invention, as embodied in an unloader for a twin-hoppered railway car constructed according to the aforementioned patent to Schemm, comprises a frame carrying a pair of rotary blow-through feeders longitudinally spaced thereon to communicate individually with the paired hopper outlets of the vehicle. The frame is mounted on a pair of wheels arranged near the center of gravity of the unloader by means of eccentrics or other suitable mechanisms adapted to raise and lower the frame with respect to the ground, and carries a pair of adjustable shackles for securing the unloader to the vehicle.

A variable speed motor arranged on the rearward end of the frame drives the rotors of the paired feeders by suitable couplings or universal joints and an interconnecting shaft extending between the feeder shafts.

The side rails of the frame are hollow and serve as longitudinal air supply conduits, and an air supply pipe is extended from one of the side rails to communicate with the air inlet of one of the feeders. The discharge pipe from this first feeder communicates directly with the air inlet of the second feeder. The discharge pipe of the second feeder extends slightly beyond the front edge of the frame and is provided with a suitable coupling for connection to a conveying line.

Each feeder comprises a casing having a material inlet in its upper region adapted to be connected to a hopper outlet. Each feeder is provided with an air inlet and an air-material outlet aligned therewith in the lower region of opposed end plates of the casing. A pocketed rotor is mounted in the casing so that rotation thereof produces successive indexing of the pockets with the aligned air inlet and air-material outlet openings. The blades of the rotor are inclined forwardly, in the direction of rotation, and form non-radial walls for the pockets.

The lateral casing wall toward which the blades rotate in the upper, or material-receiving segment of their travel is sloped upwardly and outwardly from the rotor periphery, in a substantially tangential plane extended from the rotor periphery, to meet one side of the material inlet of the casing. Therefore, the longitudinal center line of the material inlet is offset, with respect to the axis of the rotor, in the direction of the sloping casing wall. Intermediate the vertical plane of the rotor axis and that edge of the material inlet away from which the blades move in their upper, or material-receiving segment, a longitudinal dam extends upwardly from a point of running clearance with the rotor periphery and into the material inlet to divide the inlet.

The remainder of the casing wall is arranged to conform closely to the generatrix of the blade tips from the point of tangency of the sloping wall and extends arcuately about the rotor to adjacent the opposite edge of the material inlet. The aligned air inlet and air-material outlet openings are positioned in approximately the middle of this arcuate travel of the casing wall so that a plurality of blades may be used to seal between that point and the points at which the casing walls diverge from the periphery of the rotor.

Figure 4:
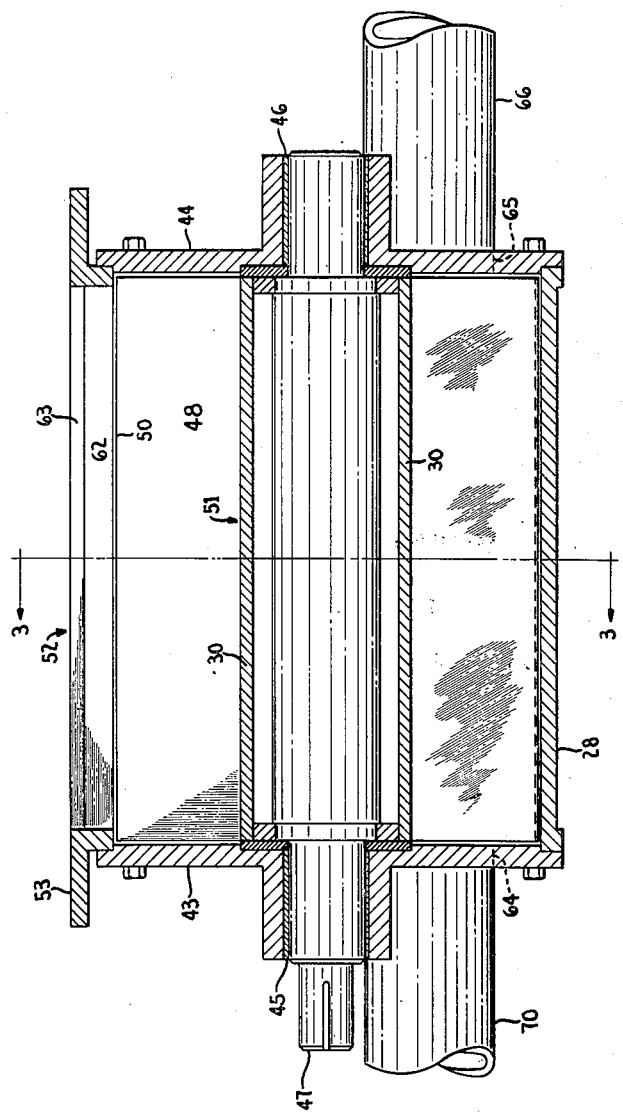

A better understanding of the invention may be derived from the accompanying drawings and description, in which:

FIG. 1 is a side view of the unloader of the invention;
FIG. 2 is a plan view of the apparatus of FIG. 1;
FIG. 3 is a cross sectional view of a feeder taken along lines 3—3 of FIG. 2; and
FIG. 4 is a sectional view taken along the lines 4—4 of FIG. 3.

As shown in FIGS. 1 and 2, the unloader is positioned beneath a railway vehicle 1 and comprises a frame 2 having a pair of side rails 3 and 3' and a pair of front and rear end rails 4 and 5, respectively. Adjacent the longitudinal centers of the side rails, a pair of discs 6 and 6' are mounted on individual shafts 7 and 7', respectively, which extend through the side rails. Each of the discs 6 and 6' carries an eccentrically-mounted, inwardly-directed stub axle 8 and 8', respectively, which support ground wheels 9 and 9', respectively. The outboard extensions of the shafts 7 and 7' are fitted with cranks 10 and 10' having suitable handles 11 and 11'. The cranks 10 and 10' are provided with locking pins 12 and 12' which engage seats 13 and 13', respectively, when the wheels are lowered to support the unloader for transport, and seats 14 and 14' when the wheels are raised to permit entry of the unloader under the car hoppers.

End rails 4 and 5 are provided with adjustable turnbuckled shackles 15 and 16, respectively, which are adapted to engage a pair of flanges 17 and 18 of the railway vehicle 1 for securement of the unloader. The end rails each carry a caster wheel 19, and front end rail 4 carries a handle 20 for use in transporting the unloader.

The side rails 3 and 3' are formed of hollow longitudinal pipe sections with short extensions 21 thereof projecting beyond the end rails 4 and 5. Each extension is threaded to receive a coupling 22, for connection to hoses such as the air supply hose 23. The couplings not in use are each closed off by a plug 24.

When the unloader of the invention is used in conjunction with a vehicle of the type disclosed in the aforementioned patent to Schemm, the side rail 3 is available to deliver fluidizing air to the side of the vehicle remote from the air supply.

A pair of rotary blow-through feeders 25 and 26 each comprising a casing 27 and 28 and a rotor 29 and 30, respectively, are mounted on the frame by supports 31 and 32, respectively, bolted to mounts 33 and 34, respectively, on the side rails. The feeders are aligned with each other longitudinally of the frame, and their rotors 29 and 30 are connected by an intermediate shaft 35 by means of suitable universal joints 36. The rearward end of the rotor 30 of the feeder 26 is connected through a coupling 37 to a motor, such as a variable-speed, electric motor 38 which is supplied with electric current by a cable 39 and is secured to the frame by a mount 40. The feeders are positioned on the frame in spaced relationship to allow each to engage the lower ends of a pair of spaced discharge hoppers 41 and 42 of the vehicle 1.

The feeders 25 and 26 are generally similar in construction and only the feeder 26 will be described in detail.

As shown in FIGS. 3 and 4, the feeder 26 comprises a casing 28 having opposed end plates 43 and 44. The end plates 43 and 44 are provided with bearings 45 and 46, respectively, which journal a rotor shaft 47 of the rotor 30. The rotor is provided with a plurality of blades 48 which form a plurality of pockets 49 therein.

The blades 48 are sloped rotationally forward at an angle, preferably in the range of 10–30 degrees, and preferably about 17 degrees, from a true radial plane drawn through their roots, so that their tips 50 have a rotational "lead" over their roots 51.

Above and substantially offset from the axis of the rotor shaft 47, the casing is provided with a material inlet 52 surrounded by a flange 53 which is arranged to meet and close against a similar flange 54 about a hopper discharge opening 55 of the vehicle discharge hopper 42. The corresponding flange 53 of feeder 25 closes against a similar flange 54 of the hopper 41.

From the edge of the material inlet which is closest to the axis of the rotor shaft 47, the casing extends as a substantially vertical wall 56 to a point 57 adjacent the generatrix of the tips of the blades 48, and continues therefrom as an arcuate wall 58 around the generatrix of the rotor blades, with a minute running clearance therebetween, to a second point 59 on the generatrix approximately diametrically opposite the first point 57. From the second point 59, the casing forms a sloping wall 60 extending upwardly and outwardly toward and to the adjacent edge 61 of the material inlet 52, with its inner surface preferably arranged to be generally tangent to the arc of the arcuate wall 58.

A longitudinal bar or dam 62 divides the material inlet and is arranged parallel to and spaced from the vertical casing wall 56 a distance approximately equal to the arcuate width of a pocket at its periphery. The dam extends vertically from a point of running clearance with the generatrix of the blades to a point approximately even with the upper surface of the flange 53, and is provided with a sloping upper surface 63 to prevent a buildup of material thereon.

The end plates 43 and 44 are provided with a gas- or air-material outlet 64 and a gas or air inlet 65, respectively. The inlet and outlet are axially aligned and are arcuately spaced approximately equidistant from the points 57 and 59 of closure of the blade tips 50 with the arcuate wall 58 of the casing.

A gas or air supply pipe 66 is connected to the air inlet 65 of the feeder 26 and receives air from the hollow side rail 3' through a branch 67 thereof and a hose 68 secured by clamps 69. The feeders 26 and 25 are connected in series by a pipe 70 extending from the air-material outlet of feeder 26 and connected to the air inlet of the feeder 25. The air-material outlet of the feeder 25 has a discharge conduit 71 connected thereto which extends beyond the end rail 4 and carries a coupling 72 adapted to receive a conveying line 73.

The side rail 3' carries a bypass pipe 74 and valve 75 adjacent the end rail 4 which bypass communicates with the discharge conduit 71. Thus, any desired amount of gas may be caused to pass from the supply rail directly into the discharge conduit without first passing through the feeder.

The discharge hoppers 41 and 42 are provided with valves 76 and 77, respectively, to provide closure thereof during transport.

In operation, the cranks 10 and 10' are rotated to the left, as viewed in FIG. 1, thereby raising the frame to maximum ground clearance on the ground wheels 9 and 9', and the locking pins 12 and 12' are secured in seats 13 and 13', respectively. The unloader is then pushed to a position adjacent the vehicle 1, whereupon the locking pins are released, the cranks 10 and 10' are rotated toward the right, as viewed in FIG. 1, and the locking pins are engaged in seats 14 and 14'. With the unloader thus reduced to its lowest positon, it is then rolled under the vehicle 1 to a position in which the respective material inlet flanges 53 are aligned with the hopper flanges 54.

The shackles 15 and 16 are connected to the flanges 17 and 18 and are drawn up until the flanges 53 are secured against the hopper flanges 54, preferably with a gasket seated therebetween.

A supply hose 23 from a source of gas or air under pressure, such as a lobe-type blower (not shown) is connected to the extension 21 of side rail 3' by the coupling 22, while the discharge conduit 71 is connected to the conveying line 73 by means of the coupling 72. A supply of electrical power is delivered to the motor 38 by means of the cable 39.

Where a vehicle according to the aforementioned patent to Schemm is to be unloaded, compressed air is supplied to the fluidizing conveying surfaces thereof.

Upon starting of the motor 38, and consequent rotation of the rotors 29 and 30, the valves 76 and 77 are opened to deliver material from the vehicle discharge hoppers 41 and 42 into the feeder casings.

The generally tangential inner plane of the sloping walls 60 directs material which descends through the hopper discharge openings 55 and the material inlets 52 over into the pockets 49 of the rotors, and deflects back into the pockets any material which might tend to be "paddled" out of the pockets by rotation of the blades 48. As a given blade root 51 in approximately top dead center of rotation progresses therefrom toward the point 59 of the tangency of the sloping wall 60, the forward or rotationally leading face of the blade forms a progressive less acute angle of incidence with the sloping wall 60 and the material moving therealong toward the pockets. Therefore, any material which is paddled from within the pockets is directed therefrom at not greater than a right angular path, with respect to the path of the downcoming material, and generally more closely approaches a concurrent, converging path. As a result, the tendency of "paddled" material to directly oppose the loading of new material is substantially eliminated, and the pockets are each substantially completely filled with material.

Continued rotation of the rotors carries the pockets thus filled around to index or alignment with their respective air inlets 65 and air-material outlets 64.

Air under pressure enters the air inlet 65 of feeder 26 from the side rails 3', branch 67, hose 68 and air supply pipe 66 and sweeps the material in the aligned pocket 49 through the outlet 64 into the pipe 70. The air-material stream in the pipe 70 is delivered to the inlet 65 of the feeder 25, sweeping material from the pockets of that feeder through the outlet 64 thereof into the discharge conduit 71, thus serially entraining material from both feeders into and through the discharge conduit 71 and the attached conveying line 73.

The particular requirements of the receiving installation to which the vehicle is unloaded may be met by regulation of the bypass valve 75 and the variable-speed motor 38. The bypass valve 75 regulates the amount of air passed through the feeders, while the control of the rotor speed regulates the rate at which material is presented to the air stream within the feeders, thereby mutually regulating the air/material ratio of the final conveying stream in the discharge conduit, and permitting the use of the unloader to serve several bins or receiving systems of widely varying capacity.

Continued rotation carries the emptied pockets which, however, contain a measure of compressed air confined therein, around to the point 57 of juncture of the arcuate wall 58 with the vertical wall 56. At this point, the confined air in the emptied pockets escapes radially outwardly into any material present in the material inlet. However, the dam 62 prevents a transverse or lateral flow of the air, in reaction to the pressure or "head" of material in the bin, in a direction across the path of the material descending adjacent the sloping wall toward the rotor. The dam 62 forces the trapped air to pass upwardly through one side of the divided material inlet 52, while the material descends through the opposite side and the center thereof. Therefore, the air is vented at a point away from the critical restriction point at which the material is to fill the pockets. The vented air thereafter rises through the material within the hopper and facilitates discharge from the hopper without interfering with the filling of the pockets.

Various changes may be made in the details of the invention as disclosed without sacrificing the advantages thereof or departing from the scope thereof as set forth in the accompanying claims.

I claim:

1. An unloader comprising a frame having a longitudinal conduit, a pair of feeders mounted longitudinally spaced from each other on said frame, each feeder having a material inlet, a pocketed rotor, a gas inlet and a gas-material outlet, said gas inlet and gas-material outlet being in mutual communication with a pocket of the rotor, means for rotating the rotors of the feeders, a gas supply pipe adjacent one end of the longitudinal conduit communicating therewith and with the gas inlet of one of the feeders, conduit means communicating with the gas-material outlet of said one feeder and with the gas inlet of the other feeder, a discharge conduit communicating with the gas-material outlet of said other feeder, a bypass conduit adjacent the other end of the longitudinal conduit communicating therewith and with the discharge conduit, whereby gas may be bypassed from the longitudinal conduit to the discharge conduit, a valve in the bypass conduit, and means for delivering a supply of gas under pressure to said longitudinal conduit for passage serially through the gas supply pipe and along the feeders to the discharge conduit.

2. An unloader comprising a frame having a longitudinal conduit, a pair of feeders mounted longitudinally spaced from each other on said frame, each feeder having a material inlet, a gas inlet, and a gas-material outlet, a gas supply pipe adjacent one end of the longitudinal conduit communicating therewith and with the gas inlet of one of the feeders, conduit means communicating with the gas-material outlet of said one feeder and with the gas inlet of the other feeder, a discharge conduit communicating with the gas-material outlet of the other feeder, means for delivering a supply of gas under pressure to the longitudinal conduit for passage serially through the gas supply pipe and along the feeders to the discharge conduit, a pocketed rotor in each feeder having a pocket thereof in communication with both the gas inlet and the gas-material outlet, a side wall of the feeder casing extending substantially tangentially from the rotor periphery toward the adjacent side of the material inlet, means for rotating the rotor in a direction in which the pockets rotate toward the tangential side wall during their exposure to the material inlet, and bypass means for bypassing a controlled portion of the supply of gas from the longitudinal conduit to the discharge conduit.

3. An unloader comprising a frame having a longitudinal conduit, a pair of feeders mounted longitudinally spaced from each other on said frame, each feeder having a material inlet, a gas inlet and a gas-material outlet, a gas supply pipe adjacent one end of the longitudinal conduit communicating therewith and with the gas inlet of one of the feeders, conduit means communicating with the gas-material outlet of said one feeder and with the gas inlet of the other feeder, a discharge conduit communicating with the gas-material outlet of the other feeder, means for delivering a supply of gas under pressure to the longitudinal conduit for passage serially through the gas supply pipe and along the feeders to the discharge conduit, a pocketed rotor in each feeder comprising a hub and a plurality of blades, said blades forming at least in part a plurality of longitudinal pockets about the hub, one of the pockets being in communication with both the gas inlet and the gas-material outlet at any position of the rotor, a side wall in the feeder casing extending substantially tangentially from the rotor periphery toward the adjacent side of the material inlet, means for rotating the rotor in a direction in which the pockets rotate toward the tangential side wall during their exposure to the material inlet, said blades being sloped forwardly in the direction of rotation at an angle of about seventeen degrees, and bypass means for bypassing a controlled portion of the supply of gas from the longitudinal conduit to the discharge conduit.

4. An unloader comprising a frame having a longitudinal conduit, a pair of feeders mounted longitudinally spaced from each other on said frame, each feeder having a material inlet, a gas inlet and a gas-material outlet, a gas supply pipe adjacent one end of the longitudinal conduit communicating therewith and with the gas inlet of one of the feeders, conduit means communicating with the gas-material outlet of said one feeder and with the gas inlet of the other feeder, a discharge conduit communicating with the gas-material outlet of said other feeder, means for delivering a supply of gas under pressure to the longitudinal conduit for passage serially through the gas supply pipe and the feeders to the discharge conduit, bypass means for bypassing a controlled portion of the supply of gas from the longitudinal conduit to the discharge conduit, a pocketed rotor in each feeder having a pocket thereof in communication with both the gas inlet and the gas-material outlet at any position of the rotor, a side wall in the feeder casing extending substantially tangentially from the rotor periphery toward the adjacent side of the material inlet, a dam extending upwardly from a point of running clearance with the periphery of the rotor and dividing the material inlet, the dam being adjacent and spaced a distance approximately equal to the peripheral width of a pocket from the side of the material inlet opposite that side towards which the tangential side wall extends, and means for rotating the rotor in a direction in which the pockets pass the dam after indexing with the gas inlet and gas-material outlet and rotate therefrom toward the tangential side wall.

5. An unloader comprising a frame having a longitudinal conduit, a pair of feeders mounted longitudinally spaced from each other on the frame, each feeder having a material inlet, a pocketed rotor, a gas inlet and a gas-material outlet, said gas inlet and gas-material outlet, at any position of the rotor, being aligned with a pocket of the rotor and at opposite ends thereof, a side wall in the feeder casing extending substantially tangentially from the rotor periphery toward the adjacent side of the material inlet, means for rotating the rotor in a direction in which the pockets rotate toward the tangential side wall during their exposure to the material inlet, a gas supply pipe adjacent one end of the longitudinal conduit communicating therewith and with the gas inlet of one of the feeders, conduit means communicating with the gas-material outlet of said one feeder and with the gas inlet of the other feeder, a discharge conduit communicating with the gas-material outlet of said other feeder, a bypass conduit adjacent the other end of the longitudinal conduit communicating therewith and with the discharge conduit, the pockets of said rotors being formed at least in part by a plurality of blades, said blades being sloped forwardly in the direction of rotation at about seventeen degrees, a dam extending substantially vertically from a point of running clearance with the periphery of the rotor and dividing the material inlet, the dam being adjacent and spaced a distance approximately equal to the peripheral width of a pocket from the side of the material inlet opposite that side toward which the tangential side wall extends, means for delivering a supply of gas under pressure to the longitudinal conduit for passage serially through the gas supply pipe and the feeders to the discharge conduit, and a valve in the bypass conduit.

6. A rotary feeder for pulverulent or granular materials comprising a casing, a pocketed rotor mounted in the casing, said casing having a material inlet through which material to be received in said pockets is adapted to be supplied and a material outlet arcuately spaced from the material inlet through which material conveyed by the pockets of the rotor as the rotor rotates is adapted to be discharged from the casing, a discharge conduit through which a stream of conveying gas is adapted to flow, said material outlet being in communication with said discharge conduit, and a dam extending upwardly from a point of running clearance with the rotor periphery and dividing the material inlet, the dam being adjacent and spaced from the side of the material inlet which the pockets pass before becoming aligned with the inlet whereby gas escaping from said pockets between said dam and said adjacent side of the material inlet passes upwardly through the inlet into the overlying material.

7. A rotary feeder as defined in claim 6 in which the dam is spaced from said side of the inlet a distance substantially equal to the width of a pocket at its periphery.

8. A rotary feeder for pulverulent or granular materials comprising a casing having a material inlet, a gas inlet, and a gas-material outlet, a pocketed rotor mounted in the casing, the gas inlet and gas-material outlet, at any position of the rotor, being in mutual communication with a pocket of the rotor, a side wall of the casing extending substantially tangentially from the rotor periphery toward the adjacent side of the material inlet, means for rotating the rotor in a direction in which the pockets rotate toward the tangential side wall during their exposure to the material inlet, the pockets of the rotor being defined at least in part by a plurality of blades, the blades being sloped forwardly in the direction of rotation with respect to a radial plane drawn through the roots of the blades, and means for passing a gas through the gas inlet for conveying material from the pockets and through the gas-material outlet.

9. A rotary feeder for pulverulent or granular materials comprising a casing having a material inlet, a gas inlet, and a gas-material outlet, a pocketed rotor mounted in the casing, the gas inlet and gas-material outlet, at any position of the rotor, being in mutual communication with a pocket of the rotor, a side wall of the casing extending substantially tangentially from the rotor periphery toward the adjacent side of the material inlet, means for rotating the rotor in a direction in which the pockets rotate toward the tangential side wall during their exposure to the material inlet, a dam extending upwardly from a point of running clearance with the rotor periphery and dividing the material inlet, the dam being adjacent and spaced a distance substantially equal to the peripheral width of a pocket from the side of the material inlet opposite the side toward which the tangential side wall extends, whereby gas escaping from said pockets between said dam and said adjacent side of the material inlet passes upwardly through the inlet into the overlying material, and means for passing a gas through the gas inlet for conveying material from the pockets and through the gas-material outlet.

10. A rotary feeder for pulverulent or granular materials comprising a casing having a material inlet, a gas inlet and a gas-material outlet, a pocketed rotor mounted in the casing, the gas inlet and gas-material outlet, at any position of the rotor, being in mutual communication with a pocket of the rotor, a side wall of the casing extending substantially tangentially from the rotor periphery toward the adjacent side of the material inlet, means for rotating the rotor in a direction in which the pockets rotate toward the tangential side wall during their exposure to the material inlet, the pockets of the rotor being defined at least in part by a plurality of blades, the blades being sloped forwardly in the direction of rotation with respect to a radial plane drawn through the roots of the blades, a dam extending upwardly from a point of running clearance with the rotor periphery and dividing the material inlet, the dam being adjacent and spaced from the side of the material inlet opposite the side toward which the tangential side wall extends, whereby gas escaping from said pockets between said dam and said adjacent side of the material inlet passes upwardly through the inlet into the overlying material, and means for passing a gas through the gas inlet for conveying material from the pockets and through the gas-material outlet.

11. A rotary feeder for pulverulent or granular materials comprising a casing having a material inlet, a gas inlet and a gas-material outlet, a pocketed rotor mounted in the casing, the gas inlet and gas-material outlet, at any position of the rotor, being in mutual communication with a pocket of the rotor, a side wall of the casing extending substantially tangentially from the rotor periphery toward the adjacent side of the material inlet, means for rotating the rotor in a direction in which the pockets rotate toward the tangential side wall during their exposure to the material inlet, the pockets of the rotor being defined a least in part by a plurality of blades, the blades being sloped forwardly in the direction of rotation at an angle of about seventeen degrees with respect to a radial plane drawn through the roots thereof, a dam extending upwardly from a point of running clearance with the rotor periphery and dividing the material inlet, the dam being adjacent and spaced a distance substantially equal to the peripheral width of a pocket from the side of the material inlet opposite the side toward which the tangential side wall extends, whereby gas escaping from said pockets between said dam and said adjacent side of the material inlet passes upwardly through the inlet into the overlying material, and means for passing a gas through the gas inlet for conveying material from the pockets and through the gas-material outlet.

12. Pneumatic conveying apparatus comprising a casing, a material inlet, a gas inlet, and a gas-material outlet, a pocketed rotor mounted in the casing, the gas inlet and the gas-material outlet being in mutual communication with a pocket of the rotor, a discharge conduit communicating with the gas-material outlet, means for delivering a supply of gas under pressure to the gas inlet for passage through said feeder to the discharge conduit, means for bypassing a controlled portion of the supply of gas to the discharge conduit, a side wall in the casing extending substantially tangentially toward the adjacent side of the material inlet, a dam extending upwardly in the material inlet from adjacent the rotor periphery and dividing the material inlet, the dam being adjacent and spaced from the side of the material inlet opposite the side toward which the tangential side wall extends, means for rotating the rotor in a direction in which the pockets rotate toward the tangential wall during their exposure to the material inlet, the pockets of the rotor being formed at least in part by a plurality of blades, and said blades being sloped forwardly in the direction of rotation at an angle of about seventeen degrees with respect to a radial plane drawn through the roots thereof.

References Cited in the file of this patent

UNITED STATES PATENTS

| | | |
|---|---|---|
| 2,299,565 | Colburn | Oct. 20, 1942 |
| 2,681,748 | Weller | June 22, 1954 |
| 2,750,233 | Yellott | June 12, 1956 |
| 2,757,049 | Temple | July 31, 1956 |
| 2,813,640 | Loomis | Nov. 19, 1957 |
| 2,858,212 | Durant et al. | Oct. 28, 1958 |
| 2,938,752 | Atkinson | May 31, 1960 |

FOREIGN PATENTS

| | | |
|---|---|---|
| 726,233 | Great Britain | Mar. 16, 1955 |